(12) United States Patent
Takenaka

(10) Patent No.: US 8,466,994 B2
(45) Date of Patent: Jun. 18, 2013

(54) DRIVE CIRCUIT OF SOLID-STATE IMAGE PICKUP DEVICE, METHOD OF DRIVING SOLID-STATE IMAGE PICKUP DEVICE AND IMAGE PICKUP SYSTEM OF SOLID-STATE IMAGE PICKUP DEVICE

(75) Inventor: Shintaro Takenaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/316,738

(22) Filed: Dec. 12, 2011

(65) Prior Publication Data

US 2012/0081585 A1    Apr. 5, 2012

Related U.S. Application Data

(62) Division of application No. 11/774,193, filed on Jul. 6, 2007, now Pat. No. 8,081,246.

(30) Foreign Application Priority Data

Jul. 31, 2006   (JP) .................................. 2006-209033

(51) Int. Cl.
*H04N 5/335*    (2011.01)

(52) U.S. Cl.
USPC .................... 348/307; 348/222.1; 348/240.2; 348/240.3; 348/362

(58) Field of Classification Search
USPC .................. 348/222.1, 240.1–240.3, 307, 362
See application file for complete search history.

(56) References Cited

U.S. PATENT DOCUMENTS

| 4,498,778 | A  | 2/1985  | White ............................ 356/606 |
| 6,542,194 | B1 | 4/2003  | Juen .............................. 348/367 |
| 6,906,748 | B1 | 6/2005  | Kawase et al. ................ 348/246 |
| 7,561,188 | B2 | 7/2009  | Kondo et al. .............. 348/222.1 |
| 7,675,559 | B2 | 3/2010  | Kishi et al. |
| 2004/0223234 | A1 | 11/2004 | Konno .......................... 359/738 |
| 2005/0128324 | A1 | 6/2005  | Kishi et al. |
| 2006/0028566 | A1 | 2/2006  | Shimono et al. .............. 348/294 |
| 2006/0098115 | A1 | 5/2006  | Toyoda .......................... 348/362 |

FOREIGN PATENT DOCUMENTS

| JP | 05-048978 A   | 2/1993 |
| JP | 06-113194 A   | 4/1994 |
| JP | 11-41523 A    | 2/1999 |
| JP | 2001-092632 A | 4/2001 |
| JP | 2002-051270 A | 2/2002 |
| JP | 2005-176105 A | 6/2005 |
| JP | 2006-033338 A | 2/2006 |
| JP | 2006-166417 A | 6/2006 |

*Primary Examiner* — Usman Khan
(74) *Attorney, Agent, or Firm* — Fitzpatrick, Cella, Harper & Scinto

(57) ABSTRACT

There is provided a drive circuit of a solid-state image pickup device capable of generating pulse for vertical scanning the interval of which changes non-linearly and pulse other than the pulse for vertical scanning without increasing a circuit size and communication time for setting an electronic shutter. There is provided a drive circuit of a solid-state image pickup device including a polynomial arithmetic operation unit for carrying out an arithmetic operation of first or higher order of polynomial; an arithmetic operation controller of generating a variable of the polynomial to control an arithmetic operation in the polynomial arithmetic operation unit; and a pulse generator of generating a pulse based on a result of an arithmetic operation on a polynomial of the polynomial arithmetic operation unit.

11 Claims, 11 Drawing Sheets

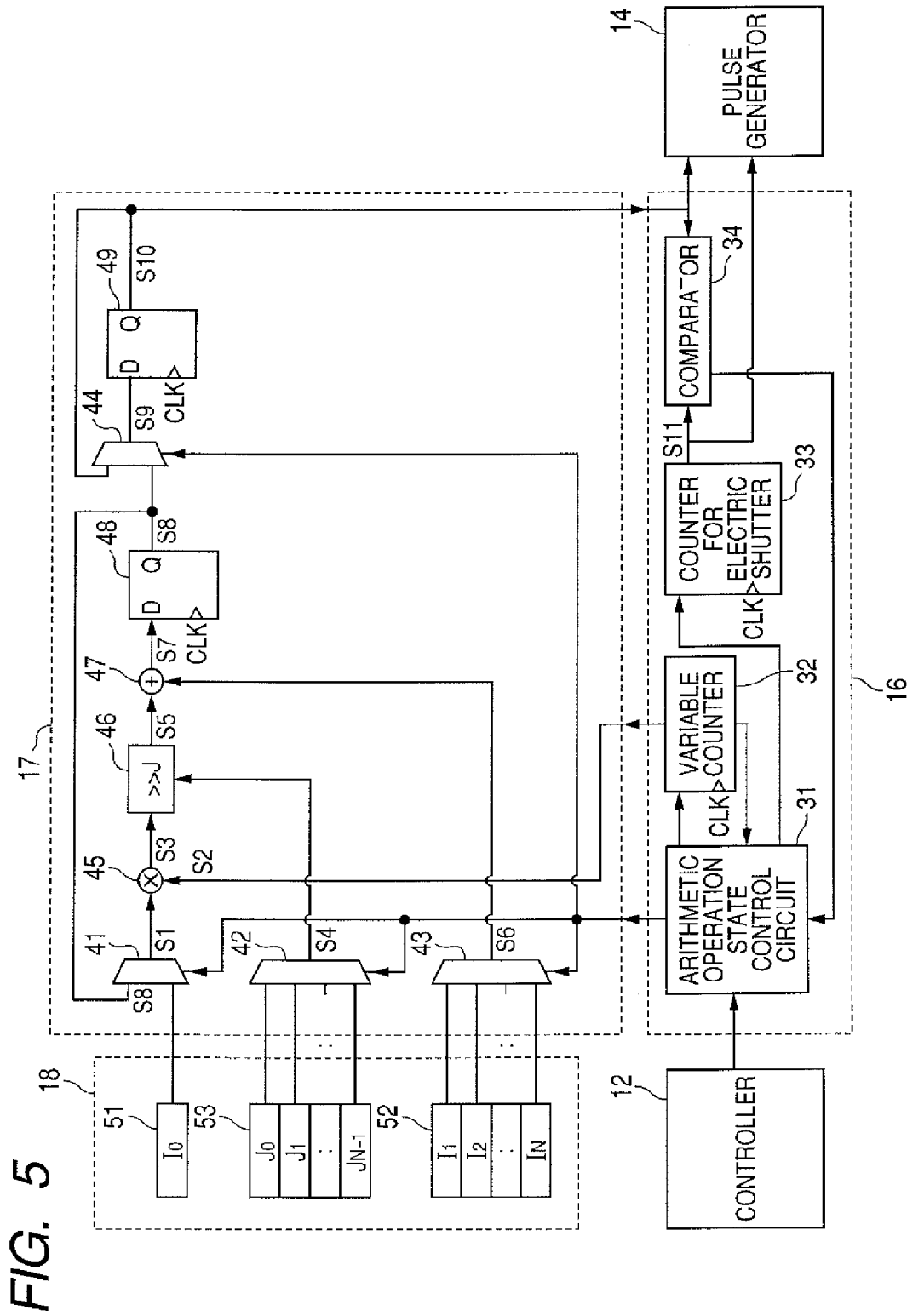

DRIVE CIRCUIT OF SOLID-STATE IMAGE PICKUP DEVICE, METHOD OF DRIVING SOLID-STATE IMAGE PICKUP DEVICE AND IMAGE PICKUP SYSTEM OF SOLID-STATE IMAGE PICKUP DEVICE

CROSS REFERENCE TO RELATED APPLICATION

This application is a division of U.S. patent application Ser. No. 11/774,193, filed Jul. 6, 2007, now U.S. Pat. No. 8,081,246, issued Dec. 20, 2011. The entire disclosure of the earlier application is hereby incorporated by reference herein.

BACKGROUND OF THE INVENTION

1. Field of the Invention

The present invention relates to a drive circuit of a solid-state image pickup device, a method of driving a solid-state image pickup device and an image pickup system of a solid-state image pickup device.

2. Description of the Related Art

An image pickup apparatus such as a digital camera includes a CMOS image sensor being an image pickup device of XY address type as an image pickup device. A CMOS image sensor is advantageously smaller than a CCD in occurrence of smear to an ignorable extent.

However, as a rolling shutter, a CMOS image sensor of XY address type accumulates charges at timings different for each line and hardly finishes an accumulation operation concurrently for all the pixels. An intent to control time for accumulating charges of a CMOS image sensor and control exposure results in displacement of the accumulation period by nearly one frame between the first line and the last line of scanning lines. Therefore, the CMOS image sensor deems not to be suitable for picking up an image of a moving object to be picked up as a still image. Therefore, a mechanical shutter for controlling exposure time of a CMOS image sensor is frequently used.

Here, a reset operation of a CMOS image sensor in each line for starting accumulation of charges will be executed prior to timing of a read operation at a signal level of accumulation charges in each line by time required for charge accumulation time. That resetting can be made different from the read at signal level of accumulation charges in operation speed. By utilization thereof, Japanese Patent Application Laid-Open No. H11-041523 has disclosed that a CMOS image sensor includes a reset operation to be carried out on a line basis at a speed to go along the running of a mechanical shutter to control exposure.

Japanese Patent Application Laid-Open No. H11-041523 includes charge accumulation to be started subjected to a reset operation to be carried out on a line basis at a speed to go along the running of a mechanical shutter and then shield light with a mechanical shutter and thereafter to carry out an operation of reading signal levels of accumulation charges on a line basis. Adjustment of the period for the reset operation and the running operation of the mechanical shutter enables exposure control at the time of image pickup.

In Japanese Patent Application Laid-Open No. H11-041523, in order to synchronize the reset operation to be carried out on a line basis with the running of the mechanical shutter that does not necessarily operate at a constant speed, a clock for vertical scanning among scanning clocks generated by a pulse generator undergoes frequency modulation with a vertical drive modulation unit and is supplied to an image pickup device.

There is a shutter mechanism including a reset operation of a CMOS image sensor as a front blade and a mechanical shutter as a rear blade. In order for the shutter mechanism to obtain a good image without exposure unevenness, it is necessary to accurately adjust reset timing of each line of a CMOS image sensor in conformity with running characteristics of a mechanical shutter being a rear blade to make exposure time of each line of a sensor constant.

On the other hand, a mechanical shutter blade is generally driven with a spring and is retained at the starting position of running mostly by attraction of an electromagnet. Therefore, due to a plurality of factors such as posture difference, temperature and moisture of an image pickup device, drive voltage of an electromagnet retaining a mechanical shutter and individual difference in the mechanical shutters, the running characteristics of a mechanical shutter is not always constant.

Therefore, it is necessary for a drive circuit of an image pickup device to generate accurate reset timing for each line of the image pickup device in conformity with the state of an image pickup apparatus at the time of picking up an image.

Japanese Patent Application Laid-Open No. 2006-033338 has disclosed the following method. With an amount of charge accumulated between one of scanning for causing each region of an image pickup device to start accumulation of charge and scanning for reading the charge accumulated in each region, and running of a mechanical shutter shielding an acceptance surface of the image pickup device, the running characteristics of a mechanical shutter is calculated. Then, accurate reset timing for each line of the image pickup element being the front blade is generated.

In addition, Japanese Patent Application Laid-Open No. 2002-051270 has disclosed an example of a timing generator of generating a great number of timing pulses used for driving a solid image pickup device.

In one of Japanese Patent Application Laid-Open No. H11-041523 and Japanese Patent Application Laid-Open No. 2006-033338, a pulse for vertical scanning among scanning pulses generated by a pulse generator undergoes frequency modulation in a vertical drive modulation section and is supplied to an image pickup device. Bringing the characteristics of vertical scanning speed and the running characteristics of a mechanical shutter into matching, that configuration can generate pulse for vertical scanning the interval of which changes non-linearly. However, it will become difficult to maintain relative relation between the pulse for vertical scanning and the pulse other than the pulse for vertical scanning. In order to discharge a photodiode in a reset operation of the photodiode of a solid-state image pickup device, the photodiode needs to be in a reset state for not less than a constant period. However, a pulse for one of starting and concluding resetting the photodiode will be required other than the pulse for vertical scanning. Therefore, such a configuration hardly maintaining relative relation between the pulse for vertical scanning and the pulse other than the pulse for vertical scanning is inappropriate. In addition, a modulation unit of controlling the vertical scanning speed is required to increase costs.

In addition, according to a memory built-in timing generator disclosed in Japanese Patent Application Laid-Open No. 2002-051270, in order to generate a pulse for vertical scanning the interval of which changes non-linearly, all the changing points of the pulse must be stored in the memory. For example, the case of a solid-state image pickup device with six million pixels including 3000×2000 pixels generating reset timing to be a front blade with a memory built-in timing generator will be described. In that case, since all the reset timing for respective 2000 lines of the image pickup device must be stored in memory, the circuit size of the memory built-in timing generator will increase to increase costs. In addition, in the case where posture difference, temperature and moisture of an image pickup device, drive voltage of an electromagnet retaining a mechanical shutter and the like fluctuate, the running characteristics of the mechanical shutter change at each occurrence. Therefore, communication with a CPU and the like will become necessary for setting pulse for vertical scanning into the timing generator, undesirably increasing communication time in order to store all reset timings for each line of the image pickup device.

An object of the present invention is to provide a drive circuit of a solid-state image pickup device, a method of driving solid-state image pickup device and an image pickup system of solid-state image pickup device capable of generating a pulse for vertical scanning the interval of which changes non-linearly, a pulse other than the pulse for vertical scanning and the like without increasing a circuit size and communication time for setting an electronic shutter.

SUMMARY OF THE INVENTION

A drive circuit of a solid-state image pickup device of the present invention includes a polynomial arithmetic operation unit for carrying out an arithmetic operation of second or higher order of polynomial; an arithmetic operation controller of generating a variable of the polynomial to control an arithmetic operation in the polynomial arithmetic operation unit; and a pulse generator of generating a pulse based on a result of an arithmetic operation on a polynomial of the polynomial arithmetic operation unit.

A method for driving a solid-state image pickup device of the present invention includes generating a variable of a polynomial; carrying out an arithmetic operation of second or higher order of polynomial with the variable; and generating a pulse based on a result of the polynomial arithmetic operation.

Other features and advantages of the present invention will be apparent from the following description taken in conjunction with the accompanying drawings, in which like reference characters designate the same or similar parts throughout the figures thereof.

Further features of the present invention will become apparent from the following description of exemplary embodiments with reference to the attached drawings.

BRIEF DESCRIPTION OF THE DRAWINGS

FIG. 5 is a block diagram illustrating an example of configuration of an N-th order polynomial arithmetic operation circuit and an arithmetic operation control circuit related to the first embodiment of the present invention.

The accompanying drawings, which are incorporated in and constitute a part of the specification, illustrate embodiments of the invention and, together with the description, serve to explain the principles of the invention.

DESCRIPTION OF THE EMBODIMENTS

Appropriate embodiments of the present invention will be described below with reference to the drawings.

First Embodiment

Figure 1:
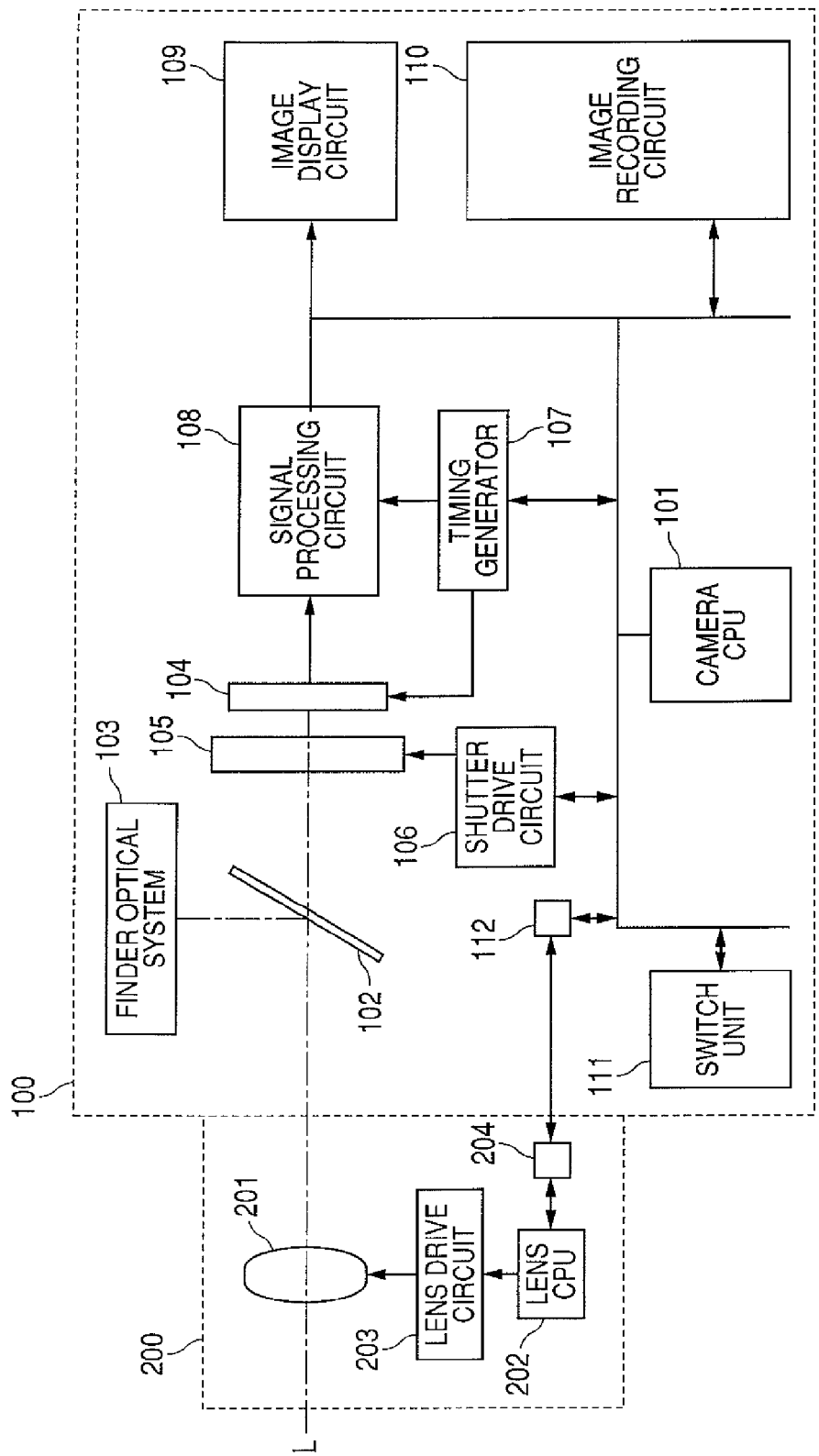
FIG. 1 is a block diagram of an image pickup system related to a first embodiment of the present invention.

FIG. 1 is a block diagram of an image pickup system related to a first embodiment of the present invention. The image pickup system related to the present embodiment includes a camera body 100 being an image pickup apparatus and an interchangeable lens device 200 installed in the camera body 100. That interchangeable lens device 200 may not be detachable from the camera body 100 but may be integrally included in the camera body 100.

At first, a configuration inside the interchangeable lens device 200 will be described. An image pickup lens 201 is movable in the direction of an optical axis L. Here, FIG. 1 illustrates only one lens for the sake of simplification but includes a group of a plurality of lenses.

The lens CPU 202 controls the position of the image pickup lens 201 through the lens drive circuit 203. In addition, the lens CPU 202 communicates with a camera CPU 101 inside the camera body through a communication contact point 204 on a side of the interchangeable lens device 200 and a communication contact point 112 on a side of the camera body 100.

Next, a configuration inside the camera body 100 will be described. The camera body 100 includes a camera CPU 101 and a mirror member 102. The camera body 100 includes a finder optical system 103 and a solid-state image pickup device 104 of XY address type. The solid-state image pickup device 104 generates an image signal by photoelectric conversion. A focal plane shutter 105 being a mechanical shutter device includes a front blade for opening an optical path and a rear blade for closing the optical path. A mirror member 102 reflects and leads, to a finder optical system 103, an optical flux of an object image having passed the image pickup device 201. As illustrated in FIG. 1, that mirror member 102 switches its position between the position present on the optical path to lead the optical flux to the optical finder 103 and a position for withdrawing from the optical path to lead the optical flux to the solid-state image pickup device 104. In the case where a user looks into the finder optical system 103 to monitor the appearance of an object, the mirror member 102 is located on the optical path as illustrated in FIG. 1. In the case of picking up a still image and otherwise in the case where a user observes a moving picture of an image pickup object displayed on an image display circuit 109 to monitor, thereby, the appearance of an image pickup object, the mirror member 102 jumps upward in FIG. 1 to withdraw, thereby, from the optical path.

A shutter device 105 is arranged on the side of the image pickup object in the solid-state image pickup device 104.

Withdrawal of a light shielding blade of the shutter device 105 from the optical path causes the optical flux to reach the solid-state image pickup device 104.

A shutter drive circuit 106 controls drive of the mechanical shutter device 105. The camera body 100 includes a timing generator 107. The timing generator 107 is a drive circuit of the solid-state image pickup device 107 of supplying the solid-state image pickup device 104 with a scanning pulse and a controlling pulse. In addition, the timing generator 107 also supplies a signal processing circuit 108 with a clock signal.

The signal processing circuit 108 causes the signal read from the solid-state image pickup device 104 to undergo known analog signal processing and digital signal processing to generate image data. An image display circuit 109 such as EVF (electric view finder) carries out a display operation with display image data generated by the signal processing circuit 108. The image recording circuit 110 records image data for recording, which is generated in the signal processing circuit 108, in one of an internal memory of the camera body and recording media detachable from the camera body.

A switch unit 111 includes a switch operated for setting image pickup conditions and a switch operated for starting an image pickup preparation operation and an image pickup operation. The camera CPU 101 communicates with the lens CPU 202 inside the interchangeable lens device 200 through the communication contact point 112 and the communication contact point 204 on the side of the interchangeable lens device 200.

In the case of picking up a still image, the image pickup system opens a front blade of the mechanical shutter 105 to open the optical path to carry out a reset operation of the solid-state image pickup device 104 and closes a rear blade of the mechanical shutter 105 to close the optical path and then reads the accumulated charge in the solid-state image pickup device 104.

Figure 2:
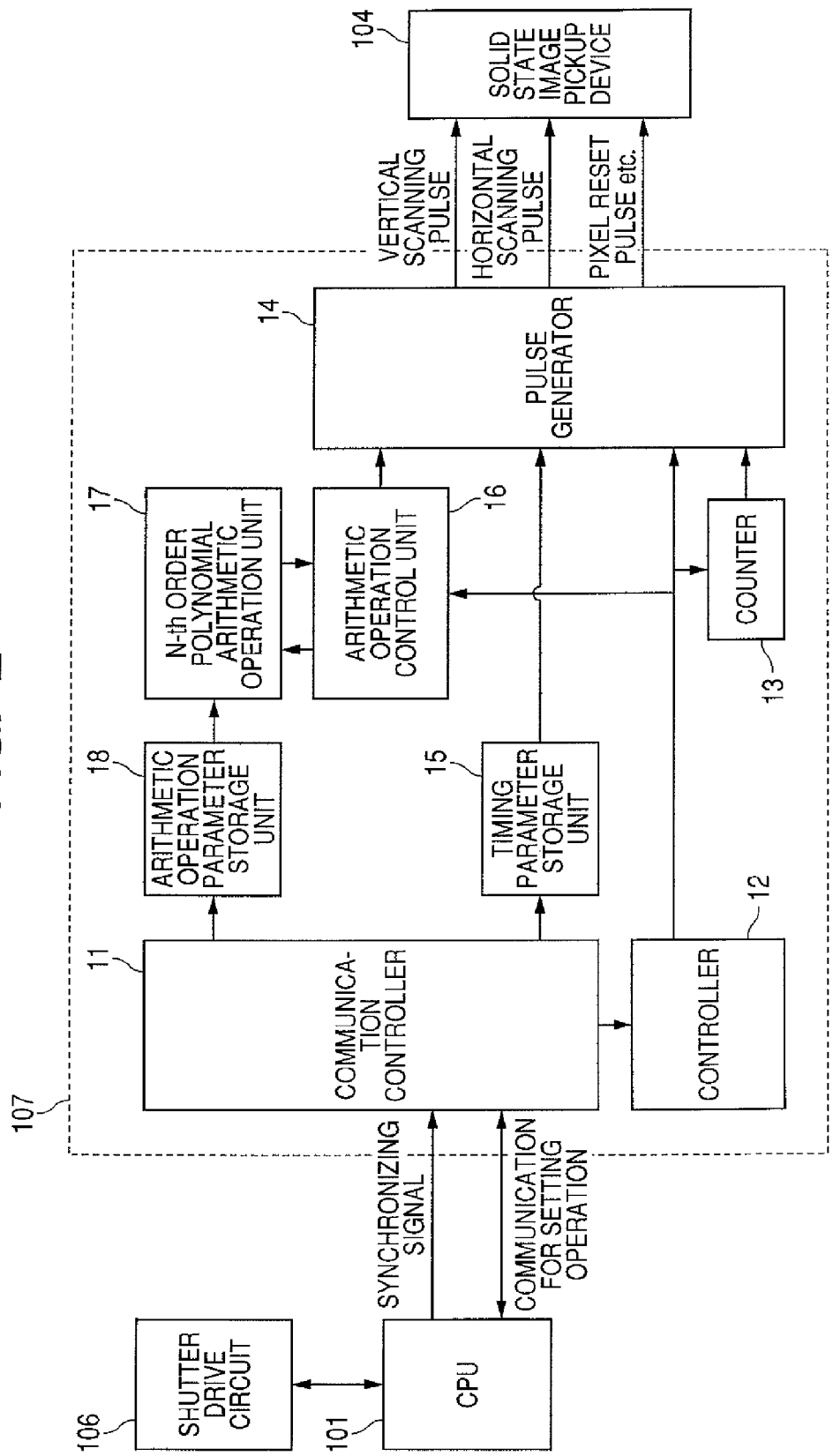
FIG. 2 is a block diagram of a timing generator related to the first embodiment of the present invention.

FIG. 2 is a block diagram of a timing generator 107 related to the present embodiment. A communication controller 11 is a control unit of controlling the operation of the timing generator 107. A timing parameter storage unit 15 for generating various pulses stores a timing parameter corresponding with the various pulses. An arithmetic operation parameter storage unit 18 stores an arithmetic operation parameter for carrying out an N-th order polynomial arithmetic operation.

A communication controller 11 controls communication for operation setting with a camera CPU 101, receives various parameters or control commands transmitted from the camera CPU 101, and stores timing parameter in the timing parameter storage unit 15 and stores the operation parameter of the N-th order polynomial arithmetic operation unit in the arithmetic operation parameter storage unit 18 to output a control command to the controller 12. The controller 12 determines an operation mode of the timing generator 107 corresponding with a control command input from the communication controller 11 and receives a synchronization signal transmitted from the camera CPU 101 through the communication controller 11. And, in order to start pulse generation in the operation mode, the controller 12 controls a counter 13 and the pulse generator 14. The operation mode of the timing generator has a plurality of operation modes such as an accumulation drive mode, a read drive mode, and a front blade electronic shutter drive mode. The accumulation drive mode is a mode for controlling the solid-state image pickup device 104 from resetting of the photodiode to accumulation starting. The read drive mode is a mode for reading the charge accumulated in the photodiode. The front blade electronic shutter drive mode is a mode for controlling the reset operation of the photodiode as the front blade regulating starting of the charge (signal) accumulation period. It is possible to use a mechanical shutter as the rear blade. That rear blade regulates completion of the charge (signal) accumulation period.

A counter 13 includes a horizontal counter for counting clock pulse with a horizontal synchronization signal transmitted from the camera CPU 101 as a starting point and a vertical counter for counting horizontal synchronization signal with a vertical synchronization signal transmitted from the camera CPU 101 as a starting point. The counter 13 manages time for regulating timing of pulse generation.

A pulse generator 14 generates a drive pulse such as a vertical scanning pulse, a horizontal scanning pulse and a pixel reset pulse for driving a solid-state image pickup device 104. The pulse generator 14 generates a drive pulse for the solid-state image pickup device 104 according to the operation mode of the timing generator 107 subjected to an order of the controller 12. The pulse generator 14 compares parameters such as a rising timing and a falling timing of a respective drive pulse stored in the timing parameter storage unit 15 with the horizontal count value and the vertical count value of the counter 13 and determines timings of the rising signal and the falling signal of the respective drive pulses to generate respective drive pulses.

An arithmetic operation controller 16 carries out the N-th order polynomial arithmetic operation with an N-th order polynomial arithmetic operation unit 17. Here, a natural number N of the N-th order polynomial is not less than one. For example, with the number N is 4, that is, the 4-th order polynomial is expressed by Formula (1). Here, the Formula (1) includes real numbers "a" to which are coefficients of the arithmetic polynomial, a variable "y" and an arithmetic polynomial operation result "T". The arithmetic operation result corresponding with the variable of the N-th order polynomial is utilized as a timing parameter for drive pulse generation and otherwise as a parameter for counter operation control.

(Formula 1)

$$T = ay^4 + by^3 + cy^2 + dy + e \quad (1)$$
$$= (((ay+b)y+c)y+d)y+e$$

The arithmetic operation controller 16 starts an operation with an instruction for an operation of the front blade electronic shutter drive mode from the controller 12. The arithmetic operation controller 16 also carries out a counter operation for managing time with reception of an instruction for an operation of the front blade electronic shutter drive mode as a starting point; manages timing to generate operation instruction to the N-th order polynomial arithmetic operation unit 17; and generates variables of the N-th order polynomial.

The N-th order polynomial arithmetic operation unit 17 carries out N-th order polynomial arithmetic operation based on coefficients of polynomial stored in the arithmetic operation parameter storage unit (coefficient storage unit) 18 and variables generated in the arithmetic operation controller 16 to output an operation result to the arithmetic operation controller 16. Thereafter, the pulse generator 14 brings a count value of the arithmetic operation controller 16, a variable value of the N-th order polynomial and the operation result of the N-th order polynomial arithmetic operation unit 17 into comparison to determine timing of a pulse rising signal to generate a pulse.

Figure 3:
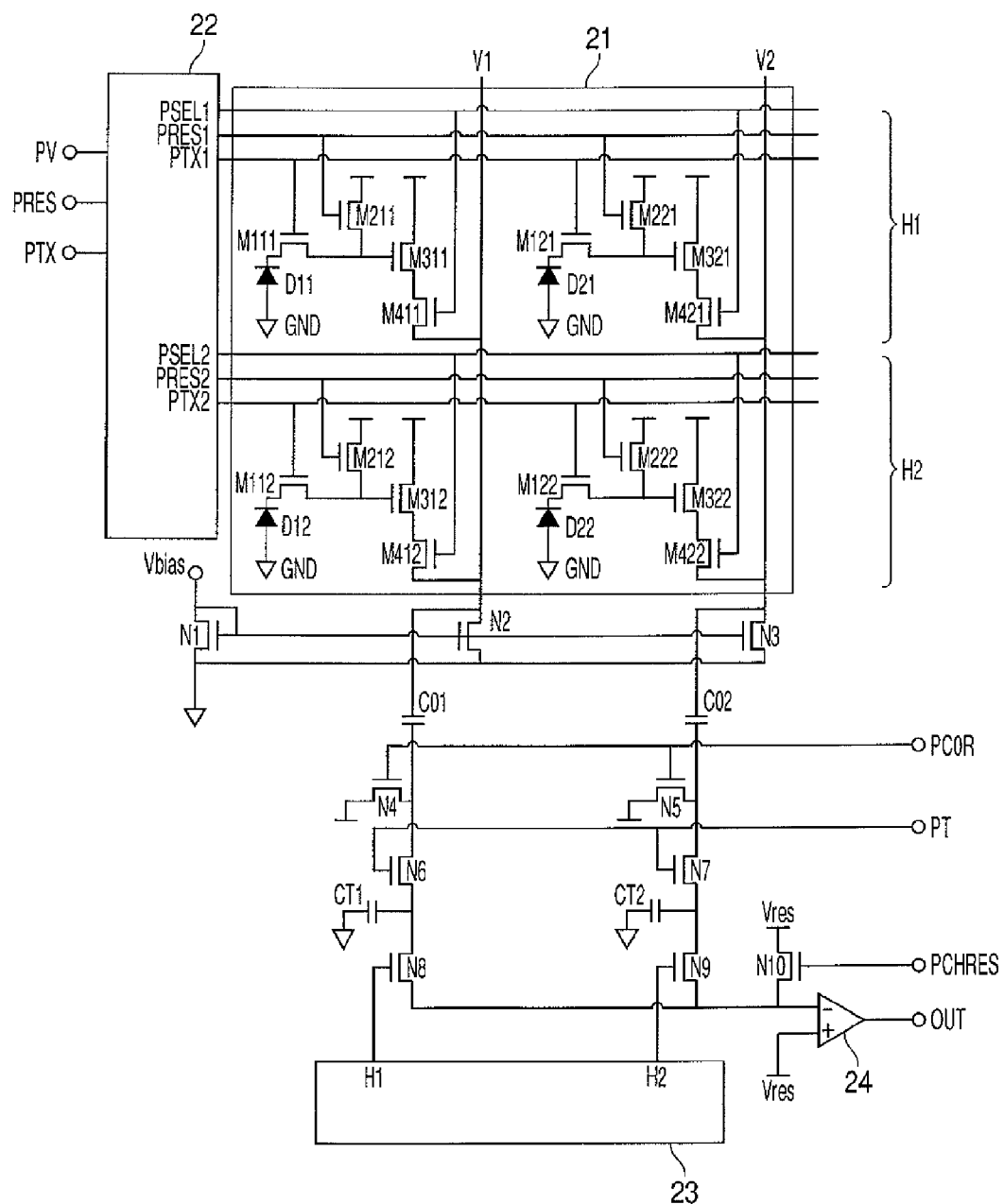
FIG. 3 is a block diagram illustrating an example of configuration of a solid-state image pickup device in FIG. 1.

FIG. 3 is a block diagram illustrating an example of configuration of a solid-state image pickup device 104 in FIG. 1.

FIG. 3 illustrates a pixel unit 21, a vertical scanning circuit block 22, a horizontal scanning circuit block 23, a differential amplifier circuit 24, an input MOS transistor N1 and load MOS transistors N2 to N3. FIG. 3 also illustrates clump capacitances C01 to C02, clump switches N4 to N5, transfer switches N6 to N7, signal retaining capacitances CT1 to CT2, horizontal transfer switches N8 to N9 and a reset switch N10. In addition, the pixel unit 21 includes photodiodes D11 to D22, transfer MOS transistors M111 to M122, reset MOS transistors M211 to M222, amplifier MOS transistors M311 to M322 and selection MOS transistors M411 to M422. Here, a unit including, for example, the photodiode D11, the transfer MOS transistor M111, the reset MOS transistor M211, the amplifier MOS transistor M311 and the selection MOS transistor M411 is referred to as a pixel. A unit including a pixel group H1 arranged in the horizontal direction is referred to as a line. The pixel unit 21 includes four pixels and the number of lines is two. In addition, Y address (line address) being arrangement position in the vertical direction relative to the respective lines in the order of arrangement from the upper side or the lower side of the pixel unit 21 is defined with an integer. For example, the Y address of the pixel group H1 of the pixel unit 21 may be 1 and the Y address of the pixel group H2 may be 2.

A method from the start of optical signal charge accumulation to reading is as follows in the case where the both of the front blade and the rear blade for controlling accumulation of optical signal charge of the solid-state image pickup device illustrated in FIG. 3 are controlled using a mechanical shutter. Prior to accumulation of the optical signal charge, gates PRES1 to PRES2 of the reset MOS transistors M211 to M222 and gates PTX1 to PTX2 of the transfer MOS transistors M111 to M122 are set to a high level. Thereby, the charge accumulated in the photodiodes D11 to D22 is returned to the reset level. Next, by setting the gates PTX1 to PTX2 of the transfer MOS transistors M111 to M122 to a low level, the photodiodes D11 to D22 start charge accumulation. Next, the reading operation is started. At first, the gate PRES1 of the reset MOS transistors M211 to M221 is set to a low level and concurrently the gate PC0R of the clump switches N4 to N5 is set to a high level. Thereafter, the gate PSEL1 of the selection MOS transistors M411 to M421 is set to a high level. Thereby, a noise signal is read to the vertical signal lines V1 to V2 and clumped by the clump capacitances C01 to C02. Concurrently, by setting the gate PT of the transfer switches N6 to N7 to a high level, the signal retaining capacitances CT1 to CT2 are reset to a clump voltage.

Next, the gate PC0R of the clump switches N4 to N5 is caused to come back to a low level and the gate PTX1 of the transfer MOS transistors M111 to M121 is set to a high level. Then, the optical signal charge accumulated in the photodiodes D11 to D21 is transferred to the gate of the amplifier MOS transistors M311 to M321. The optical signal is concurrently read to the vertical signal lines V1 to V2. Next, the gate PTX1 of the transfer MOS transistors M111 to M121 is caused to come back to a low level to end the accumulation operation of the photodiodes D11 to D21. Thereafter, the gate PT of the transfer switches N6 to N7 is set to a low level. Thereby deviation (optical signal) from the reset signal is read by the signal retaining capacitances CT1 to CT2. The operations so far store optical signals of pixels in a line of a pixel group H1 in signal retaining capacitances CT1 to CT2 connected to respective rows. Next, the gate PRES1 of the reset MOS transistors M211 to M221 and the gate PTX1 of the transfer MOS transistors M111 to M121 are set to a high level to reset the optical signal charge of the photodiodes D11 to D21. Next, with the signal supplied from the horizontal scanning block 23 and transferred through the signal lines H1 to H2, the gate of the horizontal transfer switches N8 to N9 on the respective rows is sequentially set to a high level to sequentially read voltage retained in the signal retaining capacitances CT1 to CT2 to the horizontal output line and sequentially output to an output terminal OUT. And, the horizontal output line is reset to the reset voltage Vres by the reset switch N10 in the interim of reading signals of the respective rows. Now the pixel connected to the line of the pixel group H1 is completely read. Likewise above, the signals of pixel connected to the line coming after the line of the pixel group H2 are sequentially read with the signal from the vertical scanning block 22 to read the entire pixels completely. In the case of controlling, with a mechanical shutter, the both of the front blade and the rear blade for controlling accumulation of optical signal charge, the front blade of the mechanical shutter is opened after an operation of resetting the photodiode preceding accumulation of optical signal charges to cause the light flux to come incident to the solid-state image pickup device. And after a certain exposure time, the rear blade of the mechanical shutter is closed to finish exposure and carry out the reading operation thereafter. In that case, the running characteristics of the front blade and the running characteristics of the rear blade of the mechanical shutter approximately match so that the exposure time for each line of the solid-state image pickup device, that is, the accumulation time of the optical signal will all become constant.

Figure 4A:
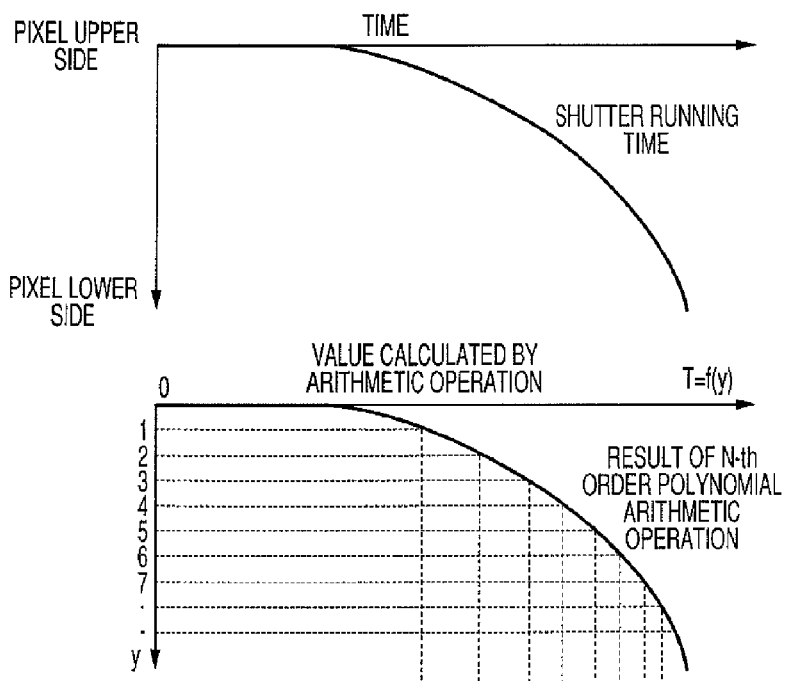
FIGS. 4A, 4B, 4C, 4D, 4E and 4F are timing charts illustrating examples of relation between waveform of major signals in FIG. 3 and N-th order polynomial arithmetic operation values.
Figure 4B:
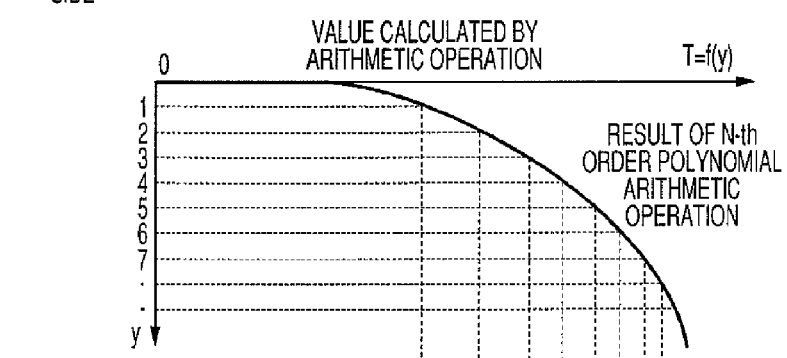
Figure 4C:
Figure 4D:

Next, an operation of the solid-state image pickup device 104 and an operation of the timing generator 107 will be described using FIG. 4 in the case of employing the both of an electronic shutter and a mechanical shutter provided in the solid-state image pickup device 104. FIG. 4A illustrates an appearance of a rear blade of the mechanical shutter 105 running from the upper side to the lower side of the pixel unit 21 of the solid-state image pickup device 104 and an appearance of the front end of the rear blade of the mechanical shutter 105 goes on shielding the optical flux coming incident to the pixel unit 21 of the solid-state image pickup device 104. That is, the running characteristics of the shutter are illustrated by the vertical axis on a scale of distance from the upper side of the pixel unit 21 and by the horizontal axis on a scale of time. The rear blade is driven by the spring force and, therefore, does not run at a constant speed. The running characteristics of the rear blade will form a curve as illustrated in FIG. 4A. The running characteristics are obtained by a known method of controlling an image pickup device. FIG. 4B is a graph of the arithmetic operation value of the N-th order polynomial arithmetic operation unit 17 with Y address in the solid-state image pickup device 104 being a variable of the N-th order polynomial scaled in the vertical axis and with the arithmetic operation value scaled in the horizontal axis. In addition, FIG. 4C is release signal waveform generated by pushing down the shutter button of the image pickup apparatus. FIG. 4D is signal waveform of a counter of counting up clock of a constant frequency with the release signal in FIG. 4C as the starting point. Here, the Y address of the solid-state image pickup device 104 being the vertical axis is replaced by distance from the upper side of the pixel unit 21. In addition, the value calculated by arithmetic operation being the horizontal axis is replaced by time with the count value, that is, release signal in FIG. 4D as the starting point. In addition, coefficients in the N-th order polynomial are set so that the curve of the shutter running characteristics obtained as in FIG. 4A and the curve given by the N-th order polynomial in the graph in FIG. 4B match.

Waveform in the operation of an electronic shutter as the front blade of the solid-state image pickup device shown in FIG. 3 will be described with reference to FIG. 4E and FIG. 4F. The vertical scanning circuit block 22 is a circuit block selecting lines of the pixel unit 21 and distributes the gate signal (PTX) of the transfer MOS transistor input from the timing generator 107, the gate signal (PRES) of the reset MOS transistor and the gate signal (PSEL) of the selection MOS transistor to the pixel group of selected lines. In addition, the vertical scanning circuit block 22 selects only one line of the pixel unit 21 and is capable of sequentially changing the selection lines to the upper and lower adjacent line and otherwise selecting all the lines of the pixel unit 21 with the vertical scanning pulse (PV) input to the vertical scanning circuit block 22. Otherwise, the vertical scanning circuit block 22 is capable of sequentially canceling the selection with the vertical scanning pulse (PV) from the state where all the lines are selected. At first, by pushing down the shutter button, the release signal and the front blade electronic shutter mode of the CPU 101 are set in the timing generator 107. The controller 12 of the timing generator 107 sends an instruction of the front blade electronic shutter mode to the arithmetic operation controller 16. The arithmetic operation controller 16 starts counting in the counter for managing time with the time point of issuance of the front blade electronic shutter mode instruction (waveform in FIG. 4D). Thereafter, the timing generator 107 generates signals of all the line selection to the vertical scanning circuit block 22. At that time, the gate signal PRES is set to a high level in advance as in FIG. 4E and the amplifier MOS transistors M311 to M322 are in the reset state.

Figure 4E:
Figure 4F:
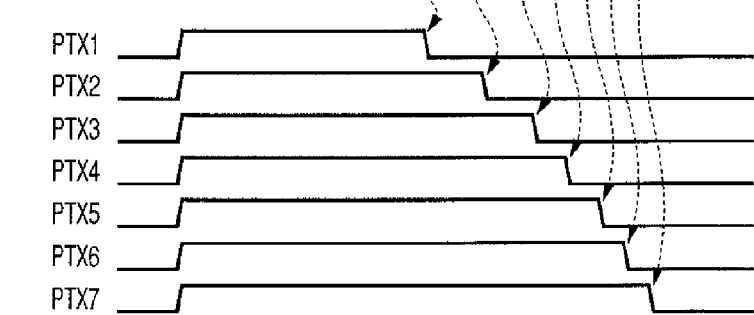

Next, the timing generator 107 compares the count value of the arithmetic operation controller 16 with the parameters of the timing parameter storage unit 15 to generate a signal of setting the gate signal PTX of the vertical scanning circuit block 22 to a high level with the pulse generator 14 (the gate signal PTX waveform in FIG. 4E). Thereby, the gate of the transfer transistors M111 to M122 is set to a high level to reset the photodiodes D11 to D22. Concurrently, the arithmetic operation controller 16 of the timing generator 107 controls the arithmetic operation of the N-th order polynomial arithmetic operation unit 17 with the variable being 1. The arithmetic operation controller 16 compares the result of the arithmetic operation calculated by the N-th order polynomial arithmetic operation unit 17 with the count value of the counter (in FIG. 4D) so that the pulse generator 14 generates the vertical scanning pulse PV corresponding to the Y address of the variable at the mutually corresponding time point for the both units. The vertical scanning circuit block 22 cancels line selection of the pixel group H1 with the vertical scanning pulse PV so that the gate PTX1 comes back to a low level (gate PTX1 waveform in FIG. 4F). The transfer MOS transistors M111 to M121 come into an off state so that the photodiodes D11 and D21 of the line of the pixel group H1 start to accumulate optical signal charge. Next, the arithmetic operation controller 16 of the timing generator 107 controls the arithmetic operation of the N-th order polynomial arithmetic operation unit 17 with the variable being 2. The pulse generator 14 generates the vertical scanning pulse PV (vertical scanning pulse PV waveform in FIG. 4E) at the time point when the value calculated by the N-th order polynomial arithmetic operation unit 17 corresponds to the counter (FIG. 4D). The vertical scanning circuit block 22 cancels line selection of the pixel group H2 with the vertical scanning pulse PV so that the gate PTX2 comes back to a low level (gate PTX2 waveform in FIG. 4F). The transfer MOS transistors M121 to M122 come into an off state so that the photodiodes D21 and D22 of the line of the pixel group H2 start to accumulate optical signal charge. Likewise above, the photodiodes for all the lines are caused to sequentially start accumulation from the reset state. After starting accumulation in all the lines, in preparation of the subsequent read operation, the timing generator 107 compares the count value of the arithmetic operation controller 16 with the parameter of the timing parameter storage unit 15. The pulse generator 14 generates a signal for causing the gate PTX of the vertical scanning circuit block 22 to come back to a low level (gate PTX waveform in FIG. 4E).

Next, operations of the N-th order polynomial arithmetic operation unit 17, the arithmetic operation controller 16 and the arithmetic operation parameter storage unit 18 will be described in further detail with a configuration example of the N-th order polynomial arithmetic operation unit 17 and the arithmetic operation controller 16 illustrated in FIG. 5. Here, FIG. 5 illustrates an example of a configuration for describing the operation of the N-th order polynomial arithmetic operation unit 17 and is not intended to limit the configuration thereof.

At first, the N-th order polynomial is developed and is replaced by an approximation formula in order to simplify realization with a circuit. The Formula (1) is an example of a fourth order polynomial and includes real numbers "a" to "e" being coefficients, a variable "y" and a solution "T" of the arithmetic polynomial. The Formula (1) is bracketed off to develop to derive Formula (2). Likewise, the Formula (2) is occasionally an N-th order polynomial and then can be developed to derive Formula (3). Here, as illustrated in Formula (4), the real number "A" serving as a coefficient of Formula (3) is approximated to a number derived by dividing an integer I by 2 to the J-th power. Then the N-th order polynomial can be expressed by Formula (5).

(Formula 2)

$$f_0(y) = a \\ f_1(y) = f_0(y)y + b \\ f_2(y) = f_1(y)y + c \\ f_3(y) = f_2(y)y + d \\ f_4(y) = f_3(y)y + e \\ T = f_4(y)$$ (2)

(Formula 3)

$$f_0(y) = A_0 \\ f_1(y) = f_0(y)y + A_1 \\ f_2(y) = f_1(y)y + A_2 \\ \vdots \\ f_N(y) = f_{N-1}(y)y + A_N \\ T = f_N(y)$$ (3)

(Formula 4)

$$A_0 = I_0 / 2^{(J_0 + J_1 + \ldots + J_{N-1})} \\ A_1 = I_1 / 2^{(J_1 + \ldots + J_{N-1})} \\ \vdots \\ A_{N-1} = I_{N-1} / 2^{J_{N-1}} \\ A_N = I_N$$ (4)

-continued (Formula 5)

$$f_0(y) = I_0 \quad (5)$$
$$f_1(y) = \frac{f_0(y)}{2^{J_0}} y + I_1$$
$$f_2(y) = \frac{f_1(y)}{2^{J_1}} y + I_2$$
$$\vdots$$
$$f_N(y) = \frac{f_{N-1}(y)}{2^{J_{N-1}}} y + I_N$$
$$T = f_N(y)$$

FIG. 5 illustrates a configuration example of the N-th order polynomial arithmetic operation unit 17 and the arithmetic operation controller 16 for carrying out the arithmetic operation with the Formula (5). The arithmetic operation controller 16 includes an arithmetic operation state control circuit 31, a variable counter 32 controlled by the arithmetic operation state control circuit 31, a counter for electronic shutter 33 and a comparator 34 comparing a result of the N-th order polynomial arithmetic operation with the counter for electronic shutter 33. The N-th order polynomial arithmetic operation unit 17 includes a multiplier 45 bringing a variable and a coefficient into multiplication, a shift circuit 46 shifting the result of arithmetic operation of the multiplier 45 J bits, an adder-subtractor 47 adding the result of the shift circuit 46 to the coefficient and a flip-flop circuit 48 temporarily storing the result of the above described arithmetic operation. Moreover, the N-th order polynomial arithmetic operation unit 17 includes a selector 41 selecting the output of the flip-flop circuit 48 and the output of the memory circuit 51 which is a coefficient of zero order and a selector 43 selecting the output of the storage circuit 52 being an integer input into the adder-subtractor 47. Moreover, the N-th order polynomial arithmetic operation unit 17 includes a selector 42 selecting the output of the storage circuit 53 being a shift amount input to the shift circuit 46 and a selector 44 for selecting the result of only the N-th order arithmetic operation from the output of the flip-flop circuit 48. Moreover, the N-th order polynomial arithmetic operation unit 17 includes a flip-flop circuit 49 storing the result of arithmetic operation on the N-th order polynomial and the output of the flip-flop circuit 49 is input to the comparator 34 and input to the pulse generator 14.

Figure 6:
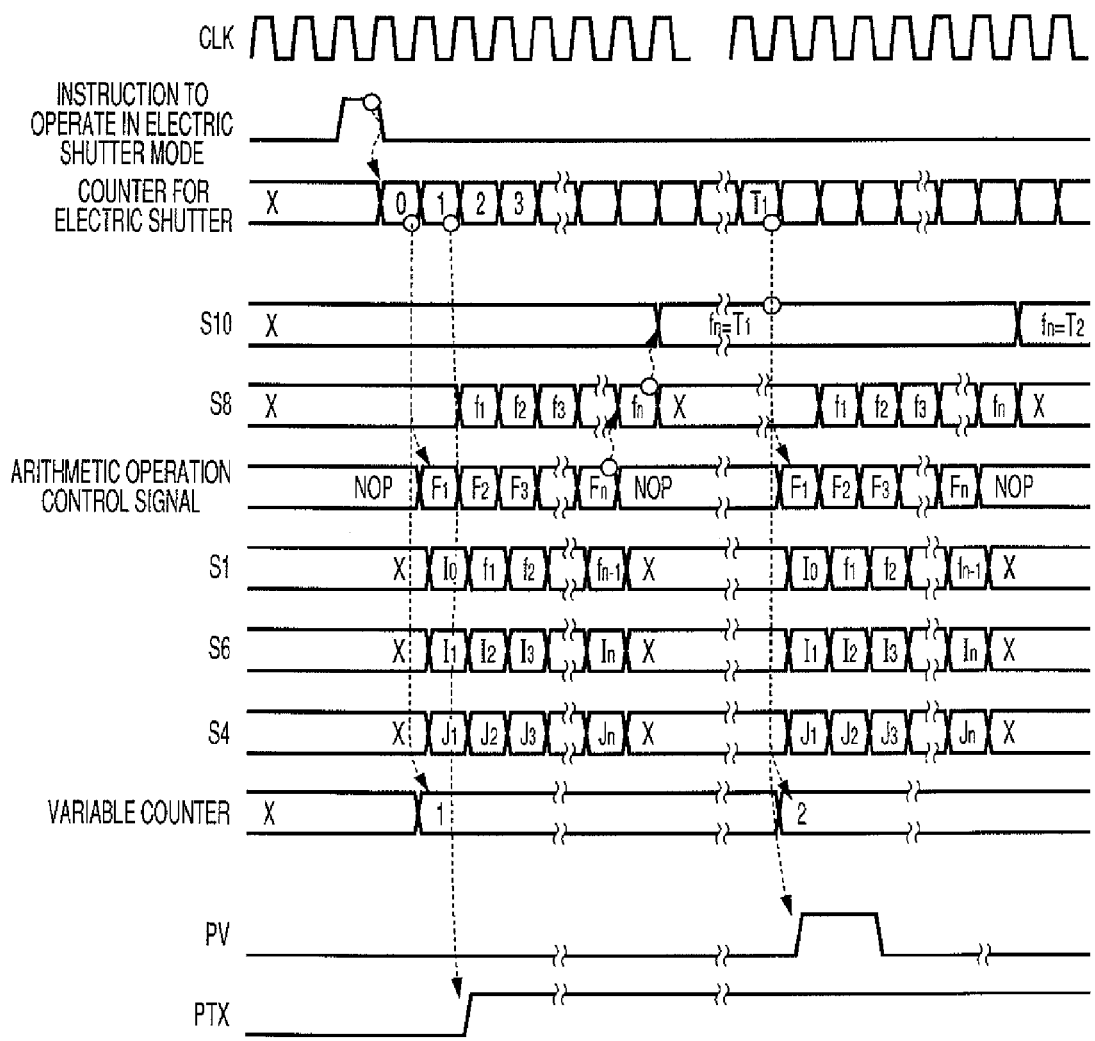
FIG. 6 is a timing chart describing operations of a configuration example illustrated in FIG. 5.

FIG. 6 is a timing chart describing operations of a configuration example in FIG. 5. At first, the arithmetic operation state control circuit 31 receives electronic shutter mode operation instruction from the controller 12 and then resets the electronic shutter counter 33 to start counting with the clock CLK. In the subsequent cycle of the clock CLK, the arithmetic operation state control circuit 31 confirms reset (with count value being 0) of the electronic shutter counter 33 and, thereafter, sets the variable counter 32 to the default value 1 and concurrently outputs, to the N-th order polynomial arithmetic operation unit 17, the arithmetic operation control signal F1 for executing the first order arithmetic operation. On receipt of the arithmetic operation control signal F1, the selector 41 outputs I0 to the signal S1. The multiplier 45 multiplies the signal S1 by the output value 1 of the variable counter 32 and outputs the result to the signal S3. Next, the arithmetic operation result S3 of the multiplier 45 shifts rightward in the shift circuit 46 J0 (signal S4) bits selected with the arithmetic operation control signal F1 in the selector 42. Next, the shift arithmetic operation result S5 of the shift circuit 46 is added to the integer I1 (signal S6) selected with the arithmetic operation control signal F1 in the selector 43 to derive a signal S7 to complete the first order arithmetic operation. The result (S7) of the first order arithmetic operation is stored in the flip-flop circuit 48 at the subsequent clock rising (subsequent cycle) of the clock CLK. Concurrently, the arithmetic operation state control circuit 31 outputs an arithmetic operation control signal F2 for carrying out second order arithmetic operation to the N-th order polynomial arithmetic operation unit 17. The selector 41 receives the arithmetic operation control signal F2 to output a signal S8 as the signal S1. A second order arithmetic operation is carried out as in the first order arithmetic operation, and the result (signal S7) of the second order arithmetic operation is stored in the flip-slop circuit 48 at the subsequent clock rising (subsequent cycle) of the clock CLK as follows. Thereafter, until the N-th order arithmetic operation completes, the N cycle arithmetic operation is repeated. When the N-th order arithmetic operation is completed, an arithmetic operation result is stored in the flip-flop 49 by the selector 44. The arithmetic operation result S10 stored in the flip-flop 49 is input to the comparator 34 so that the N-th order polynomial arithmetic operation unit 17 halts the arithmetic operation until the count value of the electronic shutter counter 33 corresponds with the arithmetic operation result S10. When the arithmetic operation result S10 corresponds with the count value S11 of the electronic shutter counter 33, the arithmetic operation state control circuit 31 counts up the variable counter 32 to carry out an N-th order polynomial arithmetic operation with variables counted up.

Likewise above, the N-th order polynomial arithmetic operation is carried out until the variable counter 32 is counted up for the number of lines of the solid-state image pickup device.

On the other hand, the pixel transfer pulse PTX of the solid-state image pickup device 104 is generated with reference to parameters stored in the electronic shutter counter 33 and the timing parameter storage unit 15. In the example in FIG. 6, the pixel transfer pulse PTX generates a rising signal at the time when the value of the electronic shutter counter 33 provides 1. In addition, the vertical scanning pulse PV generates a pulse at the time when the N-th order polynomial arithmetic operation result S10 corresponds with the electronic shutter counter 33.

Thus, the present embodiment can realize, with an electronic shutter, a front blade operation equivalent to commencement of exposure by opening the front blade of the mechanical shutter. Moreover, the drive circuit of the solid-state image pickup device of the present embodiment generates pulses, that is, the vertical scanning pulse PV with occurrence interval changing non-linearly and the pixel transfer pulse PTX with reference to the same count value. Therefore, the relative relation among those pulses can always be retained so that a photodiode is kept in a reset state for not less than a certain period at the time when the electronic shutter of the solid-state image pickup device operates. In addition, the parameters for determining the occurrence timing of the vertical scanning pulse PV with occurrence interval changing non-linearly are only coefficients of the N-th order polynomial and do not increase the circuit size of the parameter storage unit nor increase time for communication with CPU for the parameter setting.

Second Embodiment

Figure 7:
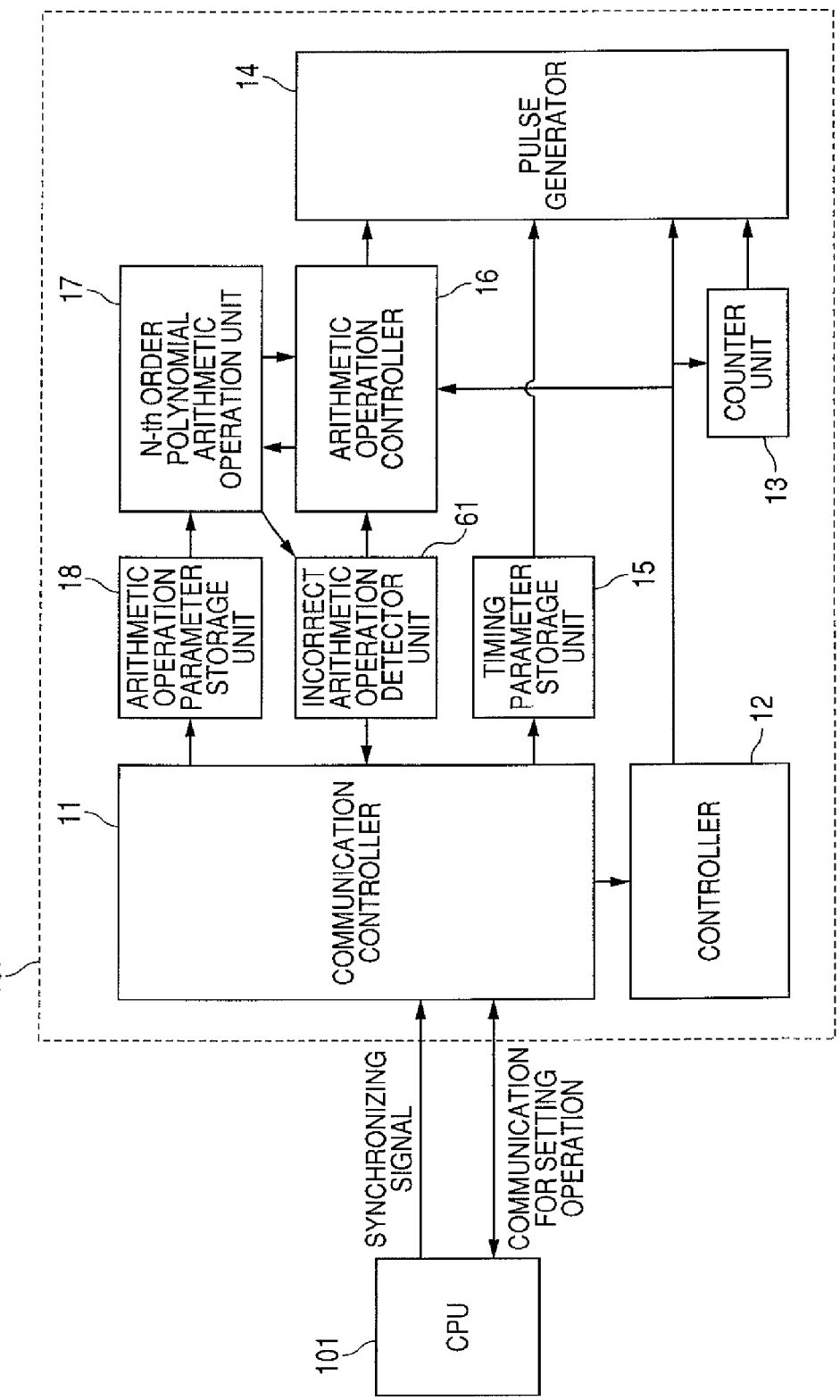
FIG. 7 is a block diagram of a timing generator related to the second embodiment of the present invention.

Focusing attention on points different from the first embodiment, the second embodiment of the present invention will be described. FIG. 7 is a block diagram of a timing generator 107 related to the second embodiment of the present invention which is different from the timing generator of the first embodiment in presence of an incorrect arithmetic operation detection unit 61 of detecting incorrect arithmetic operation result derived in an arithmetic operation of the N-th order polynomial arithmetic operation unit 17.

Normally, in the arithmetic operation circuit of hardware, the arithmetic operation data thereof is expressed in binary and a negative number is expressed in complement of two. Moreover, data length of the operation data is fixed. However, according to input data of arithmetic operation circuit, an arithmetic operation result occasionally exceeds the data length described above and in such a case the positive state is converted to a negative state and vise versa. For example, 0111 having a data length of four bits in complement of 2 is 7 in decimal number and one is added to it to derive 1000 in binary number. However, in the expression of complement of two, 1000 expresses −8 in decimal number. Thus, an occurrence where an arithmetic operation result exceeds a predetermined data length is called an overflow and is regarded as an incorrect arithmetic operation.

The incorrect arithmetic operation detection unit 61 monitors an occurrence of an overflow in an arithmetic operation circuit of the N-th order polynomial arithmetic operation unit 17 to notify the arithmetic operation controller 16 of incorrect arithmetic operation detection upon detection of an overflow. Upon receipt of notification of the incorrect arithmetic operation detection, the arithmetic operation controller 16 cancels arithmetic operation by the N-th order polynomial arithmetic operation unit 17. The pulse generator 14 generates a pulse for canceling the reset state of all lines of the solid-state image pickup device 104. Concurrently, the incorrect arithmetic operation detection unit 61 notifies the communication controller 11 of incorrect arithmetic operation detection as well. The communication controller 11 notifies the CPU 104 of incorrect arithmetic operation detection.

As described above, the second embodiment of the present invention will be capable of preventing a solid-state image pickup device from wrong operations even in the case where, in the N-th order polynomial arithmetic operation, parameters are set so that an incorrect arithmetic operation is carried out.

Third Embodiment

Figure 8:
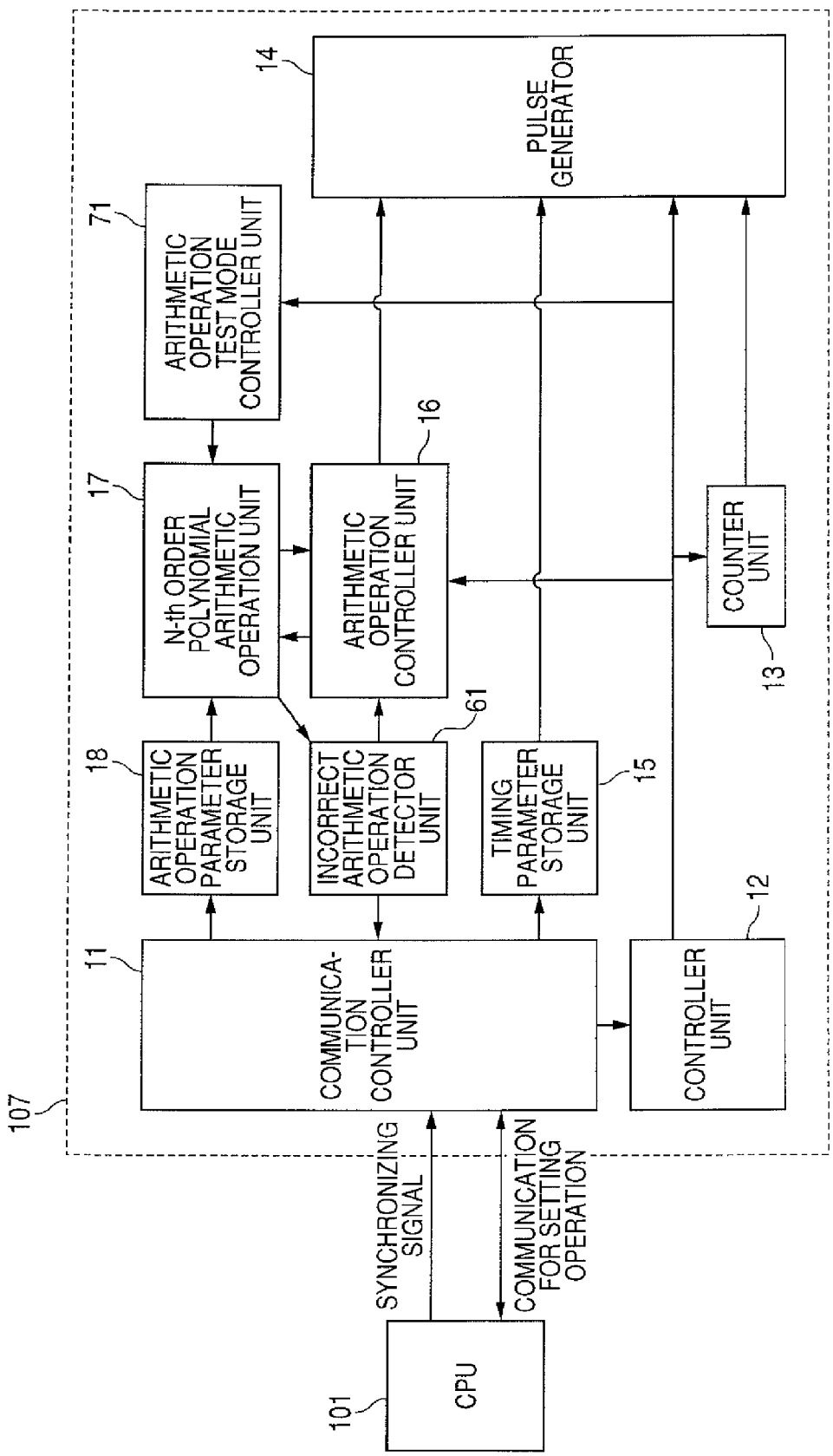
FIG. 8 is a block diagram of a timing generator related to a third embodiment of the present invention.
Figure 9:
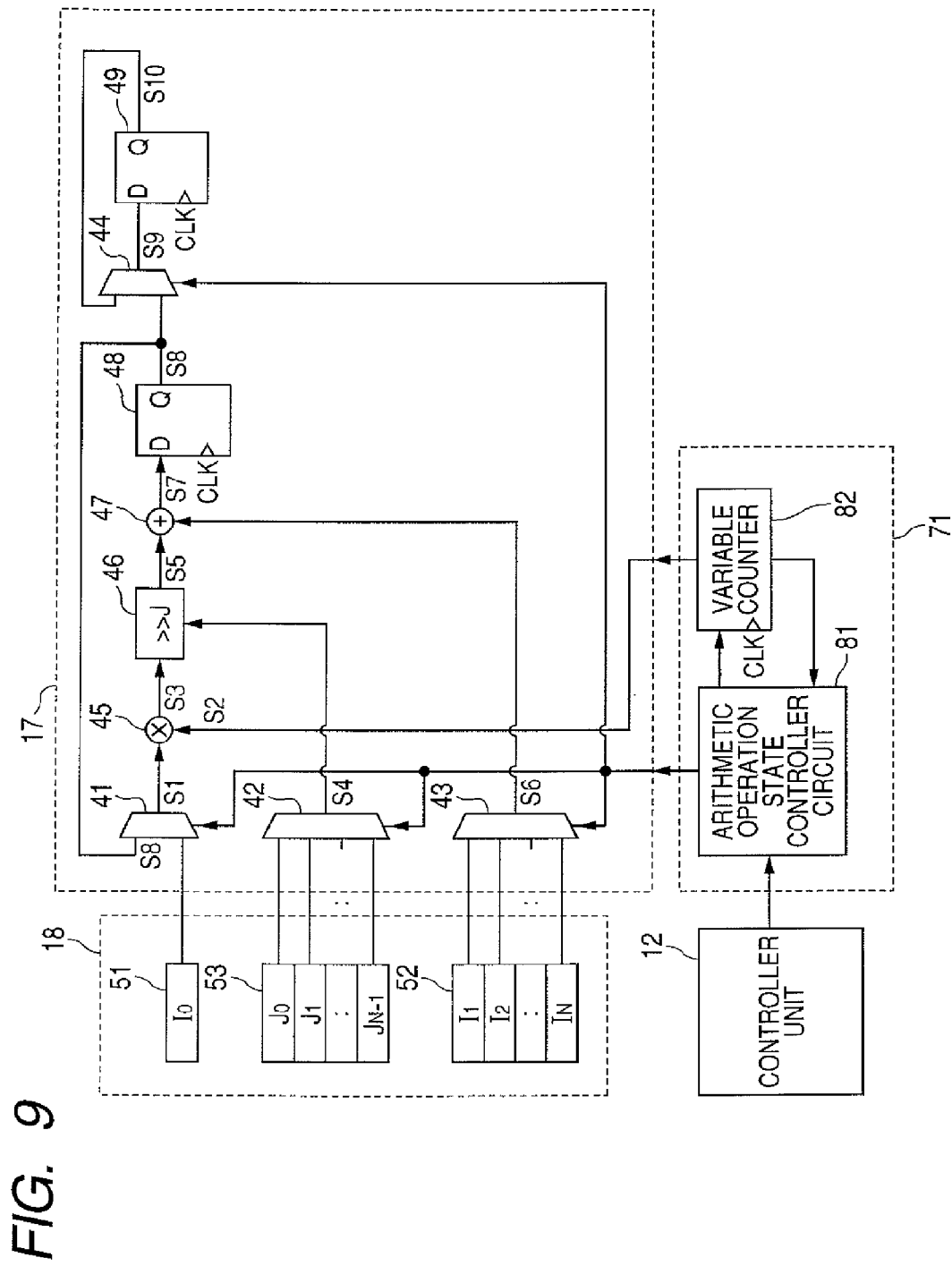
FIG. 9 is a block diagram illustrating a configuration example of an arithmetic operation test mode controller unit related to a third embodiment of the present invention.

Focusing attention on points different from the second embodiment, the third embodiment of the present invention will be described. FIG. 8 is a block diagram of a timing generator 107 related to the third embodiment of the present invention which is different from the timing generator of the second embodiment in presence of an arithmetic operation test mode controller unit 71. FIG. 9 is a block diagram illustrating an example of a configuration of an N-th order polynomial arithmetic operation unit 17 and an arithmetic operation test mode controller unit 71. The arithmetic operation test mode controller unit 71 includes an arithmetic operation test controller circuit 81 and a variable counter 82 and, unlike the arithmetic operation controller 16, generates variables of a polynomial to control arithmetic operation test of the polynomial arithmetic operation unit 17 in the arithmetic test mode. The polynomial arithmetic operation unit 17 operates an arithmetic operation of a polynomial based on variables generated by the arithmetic operation test mode controller unit 71 in an arithmetic operation test mode.

Figure 10:
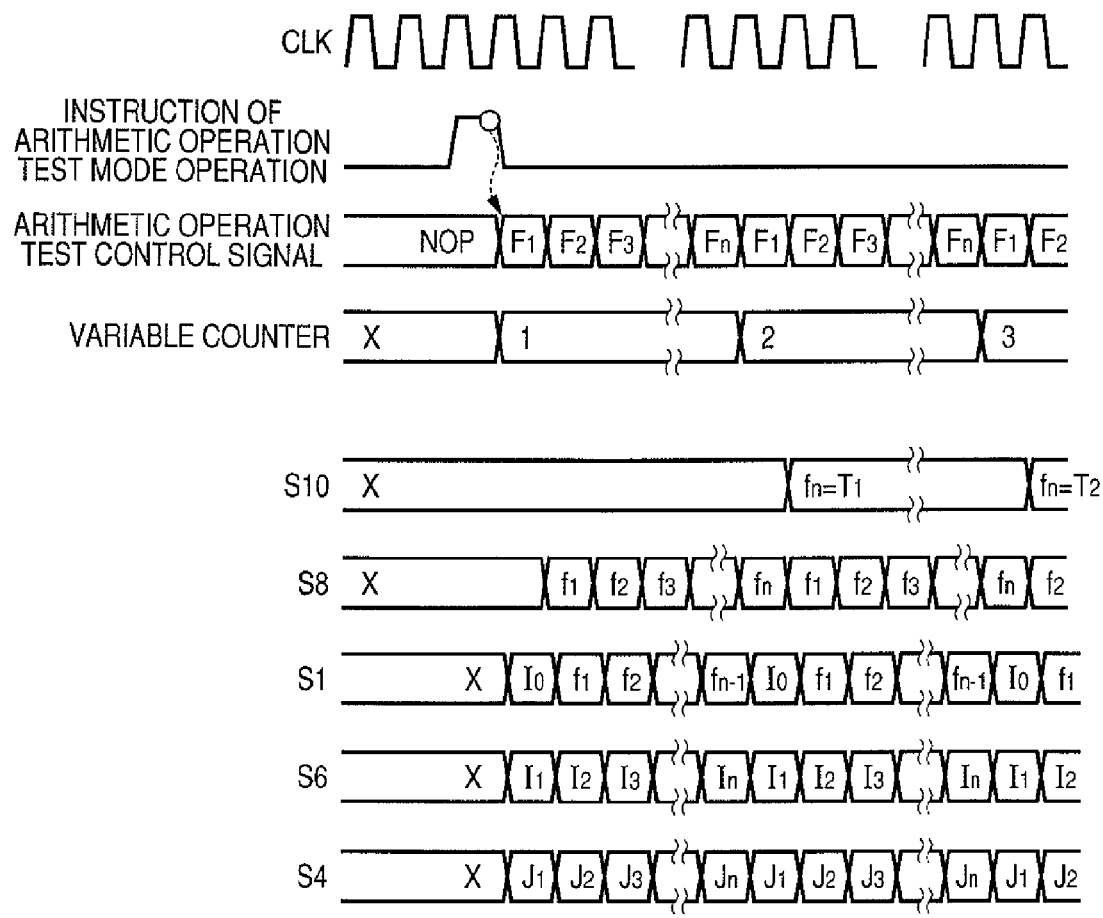
FIG. 10 is a timing chart describing operations of a configuration example illustrated in FIG. 9.

FIG. 10 is a timing chart describing operations of the configuration example illustrated in FIG. 9. An operation of a timing generator 107 related to the third embodiment of the present invention will be described with reference to FIG. 10.

At first, the arithmetic operation test controller circuit 81 receives arithmetic operation test mode operation instruction from the controller 12 and then sets the variable counter 82 to the default value 1 and concurrently outputs, to the N-th order polynomial arithmetic operation unit 17, the arithmetic operation control signal F1 for executing the first order arithmetic operation. On receipt of the arithmetic operation control signal F1, the selector 41 outputs I0 to the signal S1. The multiplier 45 multiplies the signal S1 by the output value 1 of the variable counter 32 and outputs the result to the signal S3. Next, the arithmetic operation result S3 of the multiplier 45 shifts rightward in the shift circuit 46 J0 (signal S4) bits selected with the arithmetic operation control signal F1 in the selector 42. Next, the shift arithmetic operation result S5 of the shift circuit 46 is added to the integer I1 (signal S6) selected with the arithmetic operation control signal F1 in the selector 43 to derive a signal S7 to complete the first order arithmetic operation. The result (S7) of the first order arithmetic operation is stored in the flip-flop circuit 48 at the subsequent clock rising (subsequent cycle) of the clock CLK. Concurrently, the arithmetic operation test controller circuit 81 outputs an arithmetic operation control signal F2 for carrying out second order arithmetic operation to the N-th order polynomial arithmetic operation unit 17. The selector 41 receives the arithmetic operation control signal F2 to output a signal S8 as the signal S1. A second order arithmetic operation is carried out as in the first order arithmetic operation, the result (signal S7) of the second order arithmetic operation is stored in the flip-slop circuit 48 at the subsequent clock rising (subsequent cycle) of the clock CLK as follows. Thereafter, until the N-th order arithmetic operation completes, the N cycle arithmetic operation is repeated. When the N-th order arithmetic operation is completed, an arithmetic operation result is stored in the flip-flop 49 by the selector 44. Concurrently, the arithmetic operation test controller circuit 81 counts up the variable counter 82 to carry out an N-th order polynomial arithmetic operation with variables counted up.

Likewise above, the N-th order polynomial arithmetic operation unit 17 is carried out until the variable counter 82 is counted up for the number of lines of the solid-state image pickup device to end the arithmetic operation test mode. If the incorrect arithmetic operation detection unit 61 detects an incorrect arithmetic operation during an arithmetic operation test mode, then the communication controller 11 notifies the CPU 101 of the incorrect arithmetic operation detection in the arithmetic operation test mode.

Figure 11:
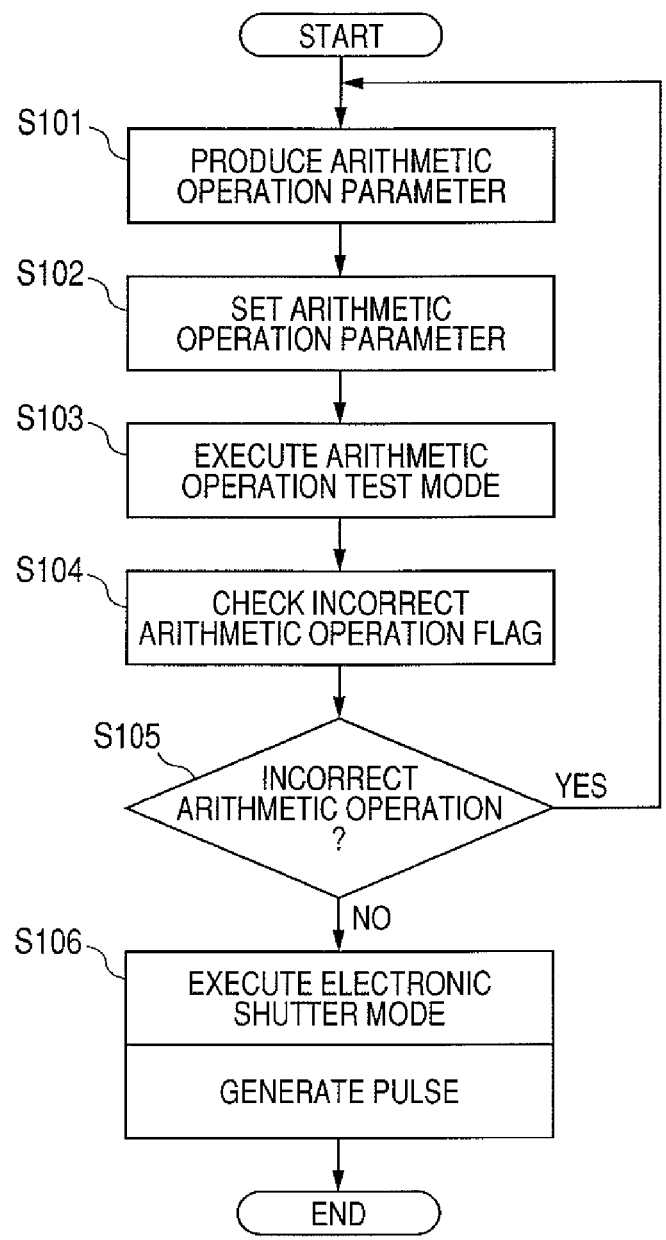
FIG. 11 is a flow chart describing operations of an image pickup system related to the third embodiment of the present invention.

FIG. 11 is a flow chart describing operations of an image pickup system related to the third embodiment of the present invention. At first, running characteristics of a rear blade of a mechanical shutter 105 are obtained by a known method of controlling an image pickup apparatus. Next, a camera CPU 101 produces arithmetic operation parameters which are N-order polynomial (Step S101). Next, the camera CPU 101 communicates with a timing generator 107 to set, in the timing generator 107, the arithmetic operation parameters produced in Step S101 (Step S102). Next, the timing generator 107 carries out an arithmetic operation test mode (Step S103) and, thereafter, checks an incorrect arithmetic operation flag during an arithmetic operation test mode to confirm no occurrence of any incorrect arithmetic operation (Step S104). In Step S105, if an incorrect arithmetic operation is detected, then the timing generator 107 notifies the camera CPU 101 of the incorrect arithmetic operation detection so that the camera CPU 101 reproduces the arithmetic operation parameters (to return to Step S101). In Step S105, if no incorrect arithmetic operation is detected, then the timing generator 107 carries out an electronic shutter mode (Step S106) to generate an electronic shutter drive pulse to the solid-state image pickup device.

According to the third embodiment, even if the camera CPU produced a wrong arithmetic operation parameter, the timing generator would not generates any wrong drive pulse by an incorrect arithmetic operation but would enable restraint of failure in image pickup of a still image with an electronic shutter.

The first to third embodiments are capable of providing an image pickup system including determination of exposure period with the both of the electronic shutter and the mechanical shutter in the solid-state image pickup device and are capable of generating pulse for vertical scanning the interval of which changes non-linearly and pulse other than the pulse for vertical scanning without increasing a circuit size and communication time for setting an electronic shutter.

The embodiments include a polynomial arithmetic operation unit for carrying out an arithmetic operation of second or higher order of polynomial; a coefficient storage unit storing coefficients in a polynomial; an arithmetic operation controller of generating a variable of the polynomial to control an arithmetic operation in the polynomial arithmetic operation unit; and a counter for counting a clock with a constant frequency. The arithmetic operation value of the polynomial obtained by the polynomial arithmetic operation unit and the count value of the counter are brought into comparison to determine the timing for pulse generation.

There are included a polynomial arithmetic operation unit for carrying out an arithmetic operation of second or higher order of polynomial; a coefficient storage unit storing coefficients in a polynomial; and an arithmetic operation controller of generating a variable of the polynomial to control an arithmetic operation in the polynomial arithmetic operation unit. Therefore, production of a plurality of parameters with non-linear intervals corresponding with respective variables generated by the arithmetic operation controller is feasible. In addition, the counter of counting a clock with a constant frequency and a plurality of parameters with non-linear intervals are brought into comparison to enable generation of pulses with non-linear intervals. In addition, there is included a timing parameter storage unit of storing timing parameters and there is included a unit for comparing the timing parameters stored in the timing parameter storage unit with the count values to determine the timing of pulse generation to generate a pulse. Therefore, pulse for vertical scanning the interval of which changes non-linearly and pulse other than the pulse for vertical scanning will be controlled with the same counter to make it simple to retain relative relation between the pulse for vertical scanning the interval of which changes non-linearly and pulse other than the pulse for vertical scanning.

Moreover, the parameters for generating pulses with non-linear intervals are only coefficients in a polynomial and, therefore, it is possible to restrain increase in the size of the circuit for storing the parameters for generating the pulses with non-linear intervals. In addition, it is possible to restrain increase in the period for communication between the CPU and the drive circuit of the solid-state image pickup device for parameter setting.

In addition, with variables in the polynomial being Y addresses in the solid-state image pickup device, the polynomial arithmetic operation unit derives an arithmetic operation value for each respective Y address, compares the arithmetic operation values corresponding with the Y addresses with the count values and determines the timing for generating the vertical scanning pulses corresponding with the Y addresses. Therefore, it will become simple to adjust the accumulation start time for each line of the solid-state image pickup device in conformity with the running characteristics of the mechanical shutter.

In addition, the second embodiment includes an incorrect arithmetic operation detection unit of detecting an incorrect arithmetic operation occurring in a polynomial arithmetic operation of the polynomial arithmetic operation unit and, therefore, is capable of restraining the solid-state image pickup device from generation of an incorrect drive pulse.

In addition, the third embodiment includes an arithmetic operation test mode controller unit, which is different from an arithmetic operation controller, of controlling an arithmetic operation test in the polynomial arithmetic operation unit. The arithmetic operation test mode controller unit is capable of sequentially carrying out a polynomial arithmetic operation with the coefficients stored in the coefficient storage unit in the polynomial arithmetic operation unit and the variables generated in the arithmetic operation test mode controller unit and confirming an occurrence of an incorrect arithmetic operation without generating any pulse. Therefore, it is possible to restrain failure in image pickup due to an incorrect arithmetic operation.

Here, any of the above described embodiments just illustrate an example of embodying for carrying out the present invention and the technical scope of the present invention must not be interpreted thereby in a limited manner. That is, the present invention can be carried out in various forms without departing from one of the technical concept thereof and the major characteristics thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-209033, filed Jul. 31, 2006, which is hereby incorporated by reference herein in its entirety.

What is claimed is:

1. An image pickup system comprising:
a polynomial arithmetic operation unit that carries out an arithmetic operation of a polynomial of a second or higher order;
an arithmetic operation controller that generates a variable of the polynomial and controls the arithmetic operation in the polynomial arithmetic operation unit;
a pulse generator that generates a pulse based on a result of the arithmetic operation in the polynomial arithmetic operation unit;
a counter that counts a clock pulse, wherein the pulse generator carries out a comparison based on the result of the arithmetic operation in the polynomial arithmetic operation unit and a count value of the counter to generate a pulse corresponding to a result of the comparison; and
a mechanical shutter device having a light shielding blade for shielding a pixel region of a solid-state image pickup device, wherein
the pulse generator generates a pulse for stipulating starting of a signal accumulating period of the solid-state image pickup device and the mechanical shutter determines a completion of the signal accumulating period.

2. The image pickup system according to claim 1, wherein a variable of the polynomial designates a line address in the solid-state image pickup device, the polynomial arithmetic operation unit obtains an arithmetic operation result for the variable designating the line address, and the pulse generator compares the arithmetic operation result of the polynomial corresponding to the variable designating the line address with the count value of the counter to generate a vertical scanning pulse corresponding to a line of the line address according to the result of the comparison.

3. The image pickup system according to claim 2, further comprising a timing parameter storage unit that stores a timing parameter, wherein the pulse generator carries out a comparison based on the timing parameter stored in the timing parameter storage unit and the count value of the counter to generate a pulse corresponding to the result of the comparison.

4. The image pickup system according to claim 2, further comprising a coefficient storage unit that stores a coefficient of the polynomial, wherein the polynomial arithmetic operation unit carries out the arithmetic operation based on the coefficient of the polynomial stored in the coefficient storage unit.

5. The image pickup system according to claim 2, further comprising an incorrect arithmetic operation detection unit that detects an incorrect arithmetic operation result derived in the arithmetic operation in the polynomial arithmetic operation unit.

6. The image pickup system according to claim 2, wherein the polynomial arithmetic operation unit carries out the arithmetic operation of the polynomial of the second or higher order with an approximation.

7. The image pickup system according to claim 2, wherein the mechanical shutter device causes the light shielding blade for shielding the pixel region of the solid-state image pickup device to change a light shielding region on the pixel region of the solid-state image pickup device.

8. The image pickup system according to claim 2, wherein the pulse generator generates a vertical scanning pulse, a horizontal scanning pulse, or a pixel reset pulse, based on the result of the comparison.

9. The image pickup system according to claim 2, wherein the polynomial arithmetic operation unit, the arithmetic operation controller, the pulse generator, the counter and the mechanical shutter device comprise a drive circuit.

10. The image pickup system according to claim 2, wherein the arithmetic operation is performed correspondingly to all line addresses in the solid-state image pickup device.

11. The image pickup system according to claim 1, wherein the polynomial of the second or higher order is approximated to characteristics of the mechanical shutter device.

* * * * *